US010245512B2

(12) United States Patent
Karolewics et al.

(10) Patent No.: US 10,245,512 B2
(45) Date of Patent: Apr. 2, 2019

(54) SECTIONAL TERRAIN EDITING

(71) Applicant: Amazon Technologies, Inc., Seattle, WA (US)

(72) Inventors: Stephen Vincent Karolewics, Seattle, WA (US); Zachary Colton Bethel, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 138 days.

(21) Appl. No.: 15/180,640

(22) Filed: Jun. 13, 2016

(65) Prior Publication Data

US 2017/0354890 A1    Dec. 14, 2017

(51) Int. Cl.
*A63F 13/00* (2014.01)
*A63F 13/65* (2014.01)
*G06F 3/0484* (2013.01)
*A63F 13/825* (2014.01)
*A63F 13/70* (2014.01)
*G06F 3/0482* (2013.01)
*A63F 13/63* (2014.01)
*G06F 8/33* (2018.01)

(52) U.S. Cl.
CPC ............. *A63F 13/65* (2014.09); *A63F 13/63* (2014.09); *A63F 13/70* (2014.09); *A63F 13/825* (2014.09); *G06F 3/0482* (2013.01); *G06F 3/04847* (2013.01); *G06F 8/33* (2013.01)

(58) Field of Classification Search
CPC .......... A63F 13/63; A63F 13/65; A63F 13/70; A63F 13/825; G06F 3/0482; G06F 3/04842
See application file for complete search history.

(56) References Cited

U.S. PATENT DOCUMENTS

| 5,897,642 | A | * | 4/1999 | Capossela | ................ | G06F 8/71 |
| 6,058,397 | A | | 5/2000 | Barrus et al. | | |
| 2005/0264566 | A1 | * | 12/2005 | Sommers | ................ | G06T 17/05 |
| | | | | | | 345/423 |

(Continued)

OTHER PUBLICATIONS

Jonathan Blow, Engine Tech: Concurrent world editing, Dec. 25, 2011, the-witness.net, <http://the-witness.net/news/2011/12/engine-tech-concurrent-world-editing/comment-page-1/>.*

(Continued)

*Primary Examiner* — Justin Myhr
(74) *Attorney, Agent, or Firm* — Baker & Hostetler LLP

(57) ABSTRACT

Techniques for sectional terrain editing are described herein. In some examples, terrain associated with at least part of a virtual area of a video game may be sectioned into a plurality of terrain sections. Each of the terrain sections may have one or more associated data collections that store terrain data related to the sections with which they are associated. This may enable multiple different users to simultaneously edit different portions of terrain with the expectation and confidence that their edits will be successfully saved and will not conflict with edits made by other users. In some examples, each terrain section may have multiple different associated data collections, for example associated with different types of terrain editing operations. This may provide further efficiency by allowing multiple different users to check out and acquire locks on different terrain data for the same terrain section at the same time.

20 Claims, 17 Drawing Sheets

(56) References Cited

U.S. PATENT DOCUMENTS

2007/0010333 A1* 1/2007 Chiu .................. A63F 13/10
                                                    463/43
2009/0083268 A1* 3/2009 Coqueret .............. G06F 8/71
2014/0280463 A1   9/2014 Hunter et al.

OTHER PUBLICATIONS

"Mastering the basics of Unity: Understanding prefabs"; https://www.pluralsight.com/blog/tutorials/mastering-basics-unity-understanding-prefabs; Pluralsight; Jun. 17, 2015; accessed Aug. 9, 2018; 5 pages.

International Patent Application No. PCT/US2017/036348; Int'l Preliminary Report on Patentability; dated Dec. 27, 2018; 8 pages.

* cited by examiner

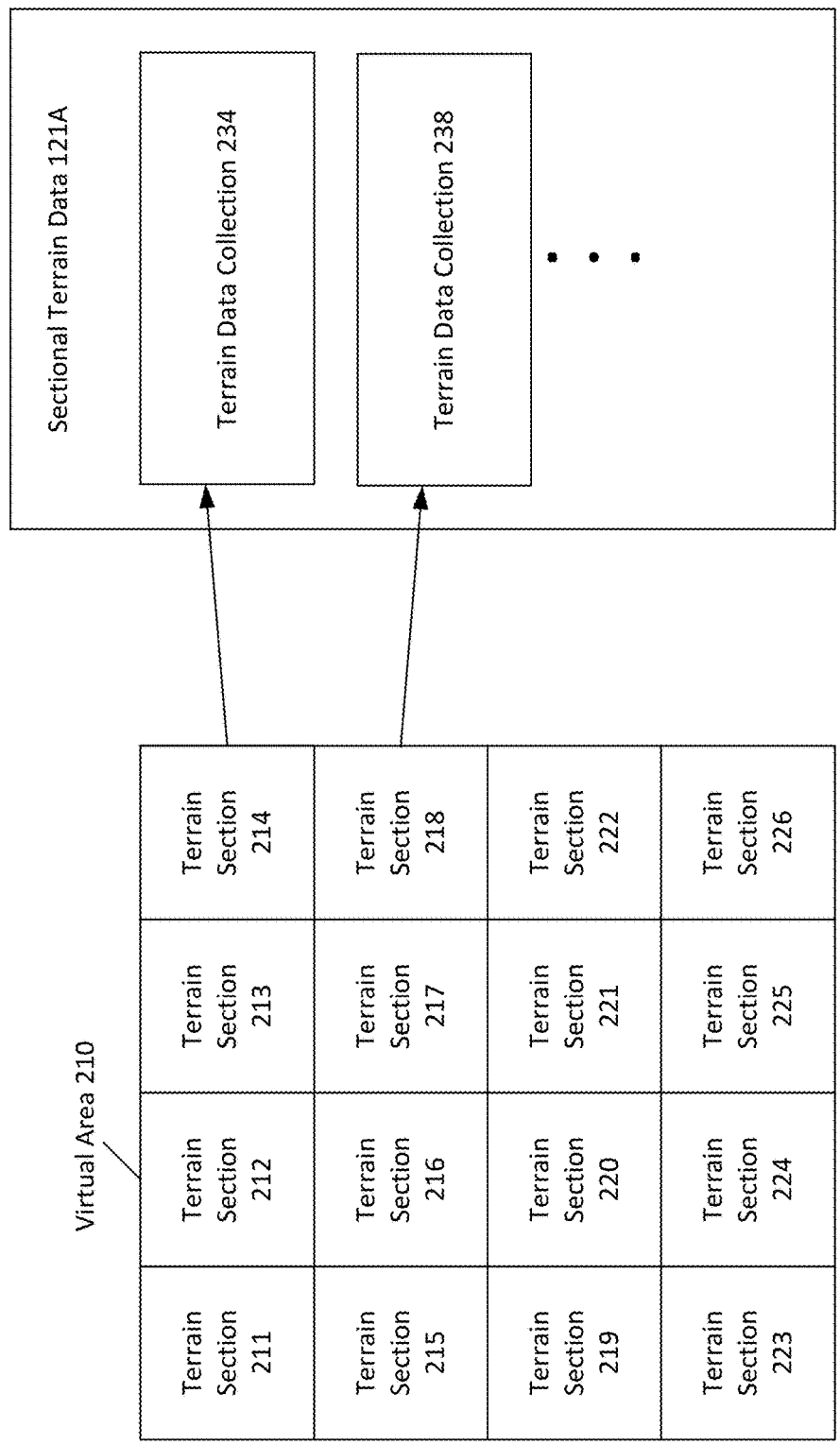

Check Out Sections Tool 410

☐ Height 411    ☒ Texture 413
☒ Vegetation 412    ☐ Layer 414

| Check Out 421 | Revert 422 |
| Load 423 | Unload 424 |
| Refresh 425 | Show Data 426 |
| Check In 427 | |

☒ Show Section Boundaries 441
☐ Show Section Info 442

111

Section Editing Area 450

| Terrain Section 211 | Terrain Section 212 | Terrain Section 213 | Terrain Section 214 |
| Terrain Section 215 | Terrain Section 216 | Terrain Section 217 | Terrain Section 218 |
| Terrain Section 219 | Terrain Section 220 | Terrain Section 221 | Terrain Section 222 |
| Terrain Section 223 | Terrain Section 224 | Terrain Section 225 | Terrain Section 226 |

FIG. 4

SECTIONAL TERRAIN EDITING

BACKGROUND

The popularity of electronically presented content items, such as video games and other media items, has increased dramatically in recent years. In some examples, in order to attract more players and increase the popularity of their games, video game designers may create intricate virtual game worlds having rich detail and visual features. One important aspect of a virtual game world is the design of its terrain. Video game designers may often spend considerable time and effort on terrain design. In some cases, designers may edit features related to terrain height, terrain vegetation, terrain textures, terrain layers, and other terrain features. Because terrain design may often require considerable amounts of work, it may often require multiple designers and other users to participate in the process and work together with one another. However, conventional development interfaces may often be limited with respect to their ability to allow effective collaboration between terrain designers. For example, conventional development interfaces may operate by storing terrain data in a single large file that may that reduce the effectiveness of multiple users collaborating simultaneously, or outright prevent it. This may increase the cost and complexity of the game development process and result in undesirable confusion and delays.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIGS. 2A-2B are diagrams illustrating example sectional terrain data that may be used in accordance with the present disclosure.

FIG. 4 is a diagram illustrating an example terrain editing interface that may be used in accordance with the present disclosure.

DETAILED DESCRIPTION

Figure 1:
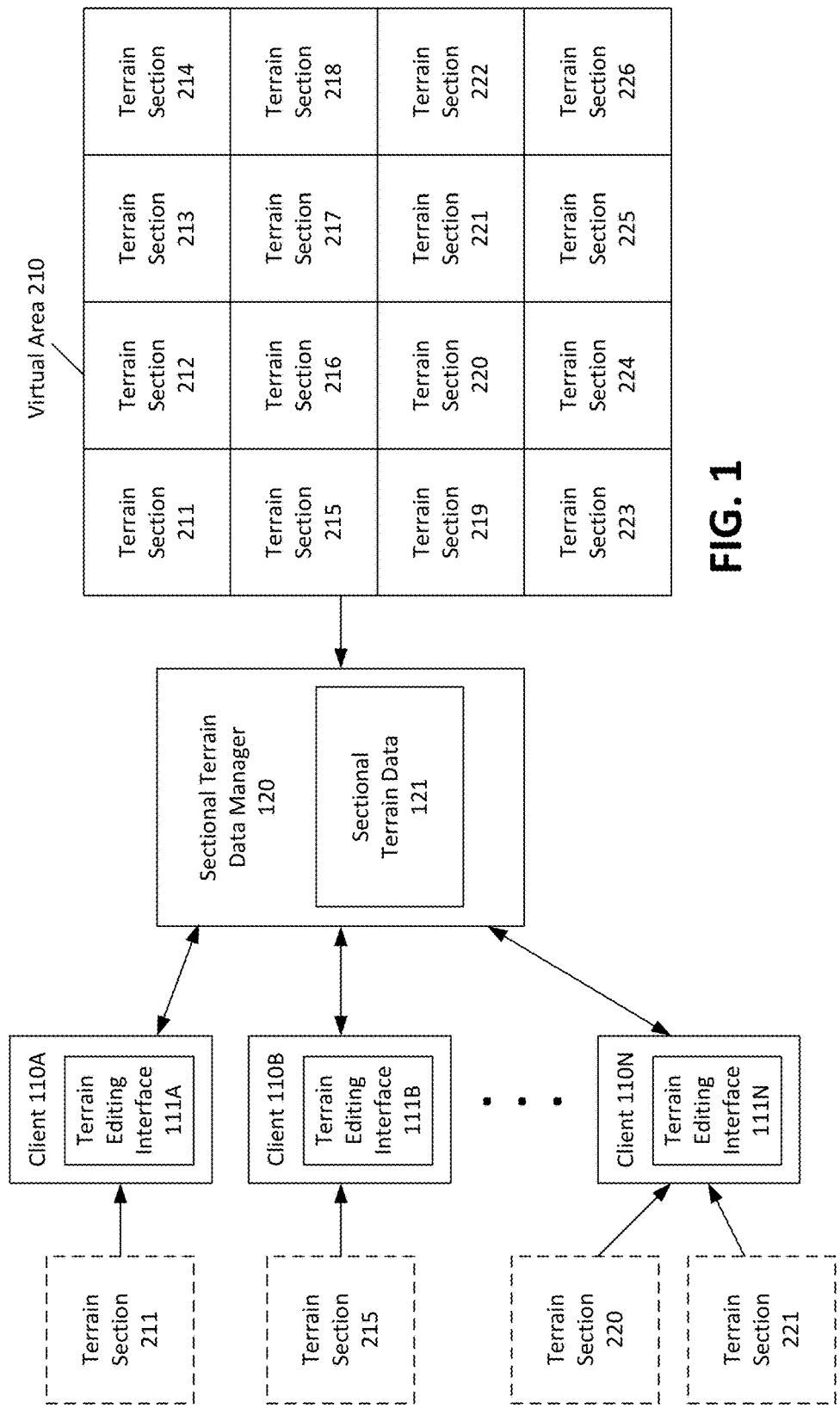
FIG. 1 is a diagram illustrating an example sectional terrain editing system that may be used in accordance with the present disclosure.

Techniques for sectional terrain editing are described herein. In particular, in some examples, terrain associated with at least part of a virtual area of a video game or other electronically presented content item may be sectioned into a plurality of terrain sections. Each of the terrain sections may have one or more associated data collections that store terrain data related to the sections with which they are associated. Organizing the terrain and storing its associated terrain data in this manner may provide a number of advantages with respect to designing and editing of the terrain. For example, various different terrain designers and other users may check out and acquire locks on different terrain sections at the same time. This may enable multiple different users to simultaneously edit different portions of terrain with the expectation and confidence that their edits will be successfully saved and will not conflict with edits made by other users.

In some examples, each terrain section may have multiple different associated data collections, for example associated with different types of terrain editing operations. For example, in some cases, each terrain section may a data collection associated with height data, another data collection associated with vegetation data, another data collection associated with texture data, and another data collection associated with layer data. The use of multiple data collections for each terrain section may, for example, provide further efficiency by allowing multiple different users to check out and acquire locks on different terrain data for the same terrain section at the same time. For example, in some cases, one user may check out and edit height data for a particular section, while a different user may simultaneously check out and edit vegetation data for the same section.

Additionally, in some examples, an easy-to-use and intuitive user interface may be provided that allows users to efficiently select terrain sections for editing, to select the type of editing operations that they wish to perform (e.g., height, vegetation, texture, layers, etc.), and to check out and otherwise acquire access and manipulate the terrain sections. In some cases, the interface may also provide status information for various terrain sections in a convenient and natural manner. For example, in some cases, a user's access level (e.g., checked out, writable, read only, etc.) associated with one or more terrain sections may be indicated by the interface using one or more indications, such as color-coded section boundaries. Also, in some examples, multi-colored (e.g., dashed) section borders may be employed, for example to indicate sections that have different types of terrain data with different respective user access levels. As another example, a locking status (e.g., fully locked, partially locked, not locked, etc.) of one or more terrain sections may also be indicated by the interface using one or more indications.

The terrain editing interface may also enable various other operations to be performed. For example, in some cases, when a particular user has read only access to a particular terrain section, the interface may allow the user to unload the terrain data associated with that terrain section. This may reduce the amount of data that is loaded by the user's system, thereby reducing complexity and potentially improving performance. Moreover, because the terrain data for that section is read only and cannot be edited, the user may achieve only minimal, if any, benefit by having the terrain data loaded for that section. Additionally, in some examples, the data for an unloaded terrain section may also be reloaded, for example if needed at a later time.

FIG. 1 is a diagram illustrating an example sectional terrain editing system that may be used in accordance with the present disclosure. As shown in FIG. 1, a number of clients 110A-N may execute terrain editing interfaces 111A-N for designing and editing terrain data for electronically presented content items, such as video games and other media items. As will be described in detail below, terrain editing interfaces 111A-N may generally allow designing and editing of various types of terrain features, such as height, vegetation, textures, layers, and other features. In some examples, in order to assist in the designing and editing process, terrain editing interfaces may display graphical representations of all or any portions of the terrain. As also shown in FIG. 1, terrain editing interfaces 111A-N may, via clients 110A-N, communicate with sectional terrain data manager 120, which, for example, may execute on one or more server compute nodes. Clients 110A-N and sectional terrain data manager 120 may communicate over one or more communications networks, for example one or more local area networks (LANs) or one or more wide area networks (WANs), such as the Internet.

Sectional terrain data manager 120 may receive information regarding a virtual area 210 of a video game or other content item for which terrain is being designed and edited. As shown in FIG. 1, sectional terrain data manager 120 may section the virtual area 210 into a number of different terrain sections 211-226. For example, each terrain section 211-226 may be assigned particular associated coordinate values (e.g., X and Y coordinate values) or other location identifiers that identify and define the terrain section 211-226 within the virtual area 210. In the particular example of FIG. 1, virtual area 210 is a squared-shaped virtual area that is divided into sixteen equal-sized square-shaped terrain sections 211-226. It is noted, however, that this is merely a non-limiting example of terrain sections, and that the disclosed techniques may be employed to section virtual areas of any shape and size into any number of sections having the same or different shapes and/or sizes with respect to one another.

As will be described in detail below, sectional terrain data manager 120 may generally manage, including saving, updating, and regulating and providing access to, sectional terrain data 121. Sectional terrain data 121 includes terrain data related to virtual area 210, such as height data, vegetation data, texture data, layer data, and other data. In particular, in some examples, sectional terrain data may include extensible markup language (XML) or data in other languages or formats that describes various features of the terrain with which it is associated. In some examples, sectional terrain data 121 may include one or more separate (e.g., independently accessible) data collections for each of the terrain sections 211-226. For example, referring now to FIG. 2A, it is seen that example sectional terrain data 121A includes a terrain data collection 234 that includes terrain data associated with terrain section 214. Sectional terrain data 121A also includes another separate data collection 238 that includes terrain data associated with terrain section 218. Sectional terrain data 121A may also include other separate data collections (not shown) associated with each of the other terrain sections 211-213, 215-217, and 219-226.

The sectioning of terrain and its associated terrain data in this manner may provide a number of advantages with respect to designing and editing of the terrain. For example, various different terrain designers and other users may check out and acquire locks on different terrain sections at the same time. As set forth above, this enables multiple different users to simultaneously edit different portions of terrain with the expectation and confidence that their edits will be successfully saved and will not conflict with edits made by other users. In the particular example of FIG. 1, it is shown that client 110A has checked out and acquired a lock on terrain data for terrain section 211 (as shown by depicting terrain section 211 with a dashed outline adjacent to client 110A). Additionally, client 110B has checked out and acquired a lock on terrain data for terrain section 215 (as shown by depicting terrain section 215 with a dashed outline adjacent to client 110B). Furthermore, client 110N has checked out and acquired a lock on terrain data for terrain sections 220 and 221 (as shown by depicting terrain sections 220 and 221 with a dashed outline adjacent to client 110N).

In some examples, the processes of checking out, editing, and checking in data may be performed collectively by clients 110A-N and terrain data manager 120. For example, in some cases, client 110A may, via terrain editing interface 111A, issue a request to sectional terrain data manager 120 to check out terrain data associated with terrain section 211. Sectional terrain data manager may then apply a lock to a terrain data collection associated with terrain section 211, whereby no users other than the user of client 110A may save changes to the terrain data collection associated with terrain section 211 while it is locked. Client 110A may then use terrain editing interface 111A to make various edits to the terrain of terrain section 211. Client 110A may then, via terrain editing interface 111A, issue a request to sectional terrain data manager 120 to check in the terrain data associated with terrain section 211. Sectional terrain data manager 120 may then save data associated with the one or more edits to the terrain data collection associated with terrain section 211 and unlock the data collection.

In some examples, each terrain section may have multiple different associated data collections, for example associated with different types of terrain editing operations. For example, in some cases, each terrain section may a data collection associated with height data, another data collection associated with vegetation data, another data collection associated with texture data, and another data collection associated with layer data. Terrain height data may, for example, include data associated with height values for various locations (e.g., X, Y coordinate values) in a virtual area, such as may be based on various geographic terrain types (e.g., mountains, cliffs, valleys, bodies of water, etc.). Terrain vegetation data may, for example, include data associated with terrain vegetation types (e.g., grass, plants, leaves, etc.), locations, quantity, density, and other data. Terrain texture data may include, for example, related to diffuse textures, locational color values, texture layers, and other data. Terrain layer data may include, for example, data associated with terrain objects (e.g., rocks, trees, etc.), locations, quantity, density, and other data.

Figure 2B:
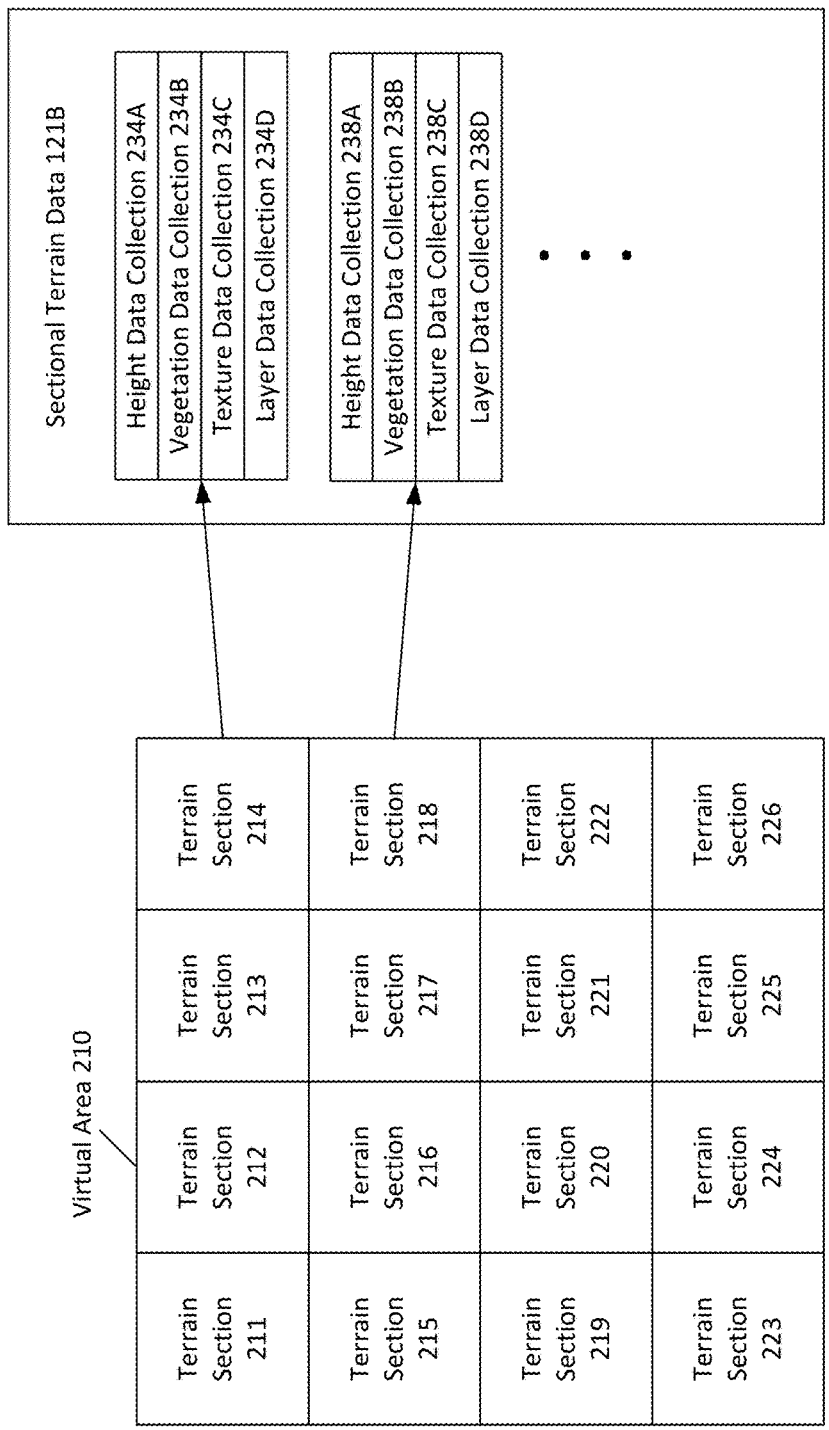

Referring now to FIG. 2B, it is seen that example sectional terrain data 121B includes multiple separate data collections 234A-D that include terrain data associated with terrain section 214. In particular, height data collection 234A includes terrain height data associated with terrain section 214. Vegetation data collection 234B includes terrain vegetation data associated with terrain section 214. Texture data collection 234C includes terrain texture data associated with terrain section 214. Layer data collection 234D includes terrain layer data associated with terrain section 214. Sectional terrain data 121B also includes multiple separate data collections 238A-D that include terrain data associated with terrain section 218. Sectional terrain data 121B may also include other multiple separate data collections (not shown) associated with each of the other terrain sections 211-213, 215-217, and 219-226.

Figure 3:
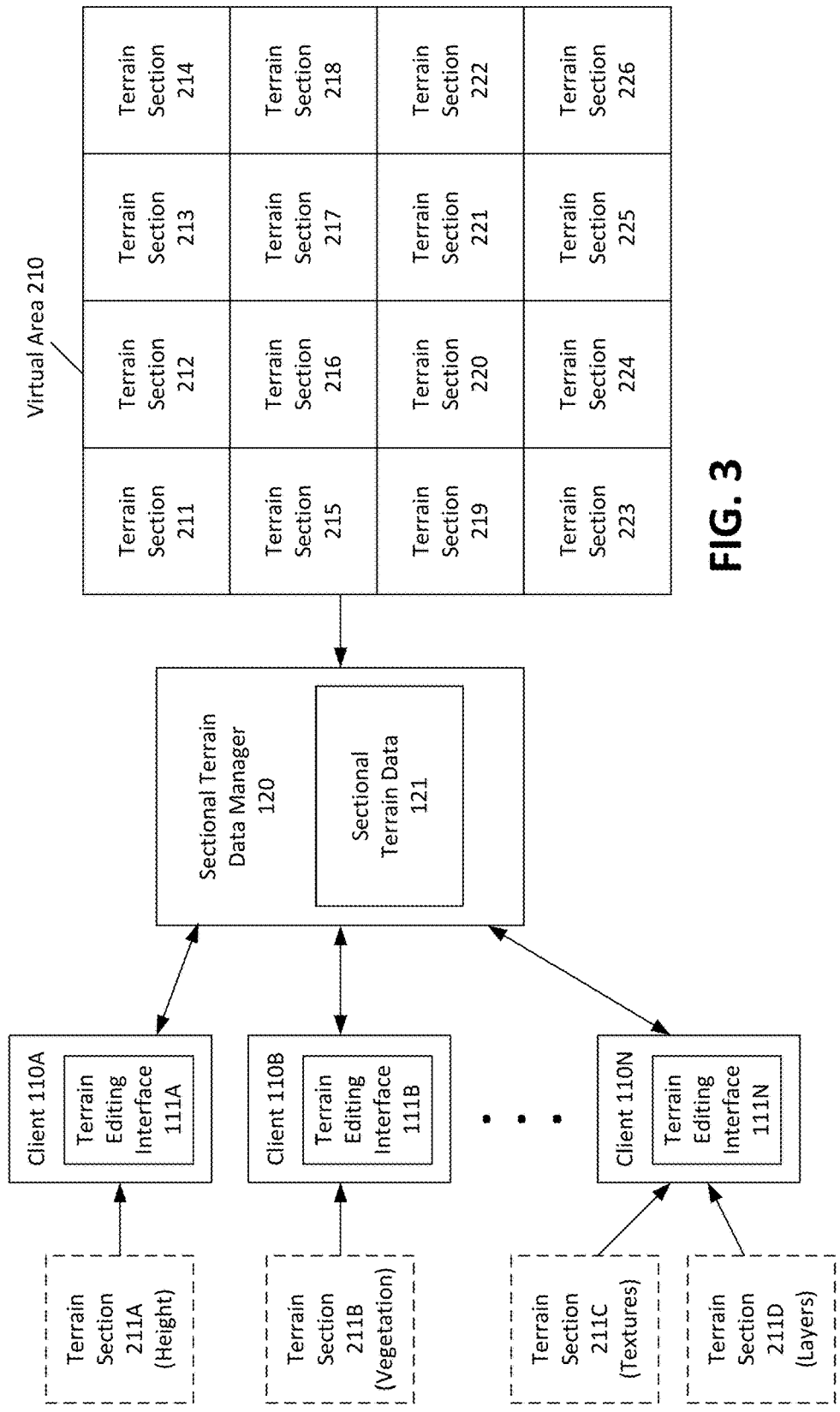
FIG. 3 is a diagram illustrating another example sectional terrain editing system that may be used in accordance with the present disclosure.

As set forth above, the use of multiple data collections for each terrain section may, for example, provide further efficiency by allowing multiple different users to check out and acquire locks on different terrain data for the same terrain section at the same time. Referring now to FIG. 3, an example is shown in which multiple different users simultaneously check out and edit different types of terrain data for the same terrain section. In the particular example of FIG. 3, it is shown that client 110A has checked out and acquired a lock on height data for terrain section 211 (as shown by the dashed box 211A adjacent to client 110A). Additionally, client 110B has checked out and acquired a lock on vegetation data for terrain section 211 (as shown by the dashed box 211B adjacent to client 110B). Furthermore, client 110N has checked out and acquired a lock on texture and layer data for terrain section 211 (as shown by the dashed boxes 211B and 211C adjacent to client 110N).

Thus, as set forth above, sectional terrain and terrain data may allow efficient and reliable multi-user collaboration for editing and design of terrain. Some example features of a terrain editing interface in accordance with the disclosed techniques will now be described in detail. In particular, referring now to FIG. 4, an example terrain editing interface 111 includes a section editing area 450 and a check out sections tool 410. Generally, section editing area 450 may enable performance of various types of terrain editing operations, such as editing of height, vegetation, texture, layer, and other terrain features. In the particular example of FIG. 4, section editing area 450 includes representations of terrain sections 211-226. In some examples, section editing area 450 may provide graphical representations of the terrain within the terrain sections that it includes. For example, section editing area 450 may include graphical representations of terrain sections 211-226, for example including graphical depictions of terrain features, such as height, vegetation, texture, layer, and other terrain features. Section editing area 450 may also allow users to select and navigate throughout various terrain sections.

As will be described in detail below, check out sections tool 410 may enable various operations to be performed with regard to terrain sections and their associated data collections, such as check out, revert, load, unload, refresh, show data, checkin, show section boundaries, show section information, and others. In particular, check out button 421 may allow one or more data collections associated with one or more terrain sections to be checked out by a user. For example, in some cases, a user may select one or more terrain sections in section editing area 450 for check out. In the particular example of FIG. 4, it is seen that terrain sections 216, 217, 220, and 221 are selected, as indicated by the thick bold lines surrounding those terrain sections. In some examples, terrain sections 216, 217, 220, and 221 may be selected using a mouse, touchscreen, keyboard, and/or other input controls. In addition to selecting terrain sections, one or more particular types of data associated with the selected terrain sections may also be selected, for example using check boxes 411-414 of check out sections tool 410. In particular, check box 411 is for selecting height data collections, check box 412 is for selecting vegetation data collections, check box 413 is for selecting texture data collections, and check box 414 is for selecting layer data collections. In the particular example of FIG. 4, vegetation check box 412 and texture check box 413 are selected. It is noted, however, that, in other examples, other different combinations of checkboxes 411-414 may be selected, for example including any or all of checkboxes 411-414.

In some examples, upon selecting one or more terrain sections (e.g., sections 216, 217, 220 and 221 in FIG. 4) and one or more data types (e.g., vegetation and texture in FIG. 4), a user may employ check out sections tool 410 to perform one or more operations with respect to those selections. In particular, selection of Check out button 421 may cause selected sections for the selected data types to be checked out, such as described above. Selection of Revert button 422 may cause selected sections for the selected data types to be reverted, which may cause edits made to the selected sections to be removed and revert the selected sections to their last saved or synchronized state. Selection of buttons 423 or 424 may cause selected sections to be loaded or unloaded, which are described in detail below with reference to FIGS. 6A-C. Selection of Check In button 427 may cause selected sections for the selected data types to be checked in, such as described above. In some cases, for example to help avoid unintended or erroneous check ins, other controls may be employed for checking in of terrain data, such as pop-up messages requesting confirmation of check in, controls external to check out sections tool 410, and the like.

Selection of Refresh button 425 may operate on all terrain sections 211-226 and may synchronize a locked state of the terrain sections 211-226 with their corresponding state from sectional terrain data manager 120. The Refresh button 425 may sometimes be employed, for example, in cases when a user has been recently working offline (e.g., not connected to sectional terrain data manager 120) or if certain data collections are checked in to sectional terrain data manager 120. Selection of Show Data button 426 may cause the underlying XML or other data for one or more data collections within sectional terrain data 121 to be displayed to a user. In addition to buttons 421-427, check out sections tool 410 also includes check boxes 441 and 442, which may provide further options for display of information to users of the terrain editing interface 111. In particular, check box 441 may be selected to cause section editing area 450 to show boundaries of sections 211-226, for example as depicted in FIG. 4. Deselecting (e.g., unchecking) check box 441 may cause the section boundaries to not be shown. As will be described in greater detail below, check box 442 may be selected to cause section editing area 450 to show information about various terrain sections 211-226, such as whether they are checked out, writable, read only, and other information.

It is noted that the terrain editing interface 111 of FIG. 4 is merely provided as a non-limiting example terrain editing interface, and that many other interfaces with additional or alternative controls and functionality may be employed in accordance with the disclosed techniques. For example, in some cases, if a user begins to make edits to a terrain section and/or type of terrain data (e.g., height, vegetation, textures, layers) that is not checked out to the user, the terrain editing interface 111 may prompt the user, for example using a pop-up message or other indication, that the terrain section and/or terrain data type is not checked out to the user and/or is locked by another user. In some examples the user may be provided with contact information and/or interfaces (e.g., chat, email, text, phone, etc.) for contacting the other user to request check out of the terrain section and/or data type or otherwise further collaborate with the other user. Additionally, in some examples, even when a user is editing a terrain section and/or terrain data type that is checked out to the user, the terrain editing interface 111 may determine that edits being made by the user may invalidate or otherwise negatively affect edits being made by another user. For example, while a first user is editing height for a terrain section, it may be determined that these height edits may invalidate texture edits having slope limits being made by a second user in the same terrain section. In examples such as these, a warning or other indication may be displayed to the first or second user of potential conflicts along with contact or other information for the other affected user(s).

Figure 5A:
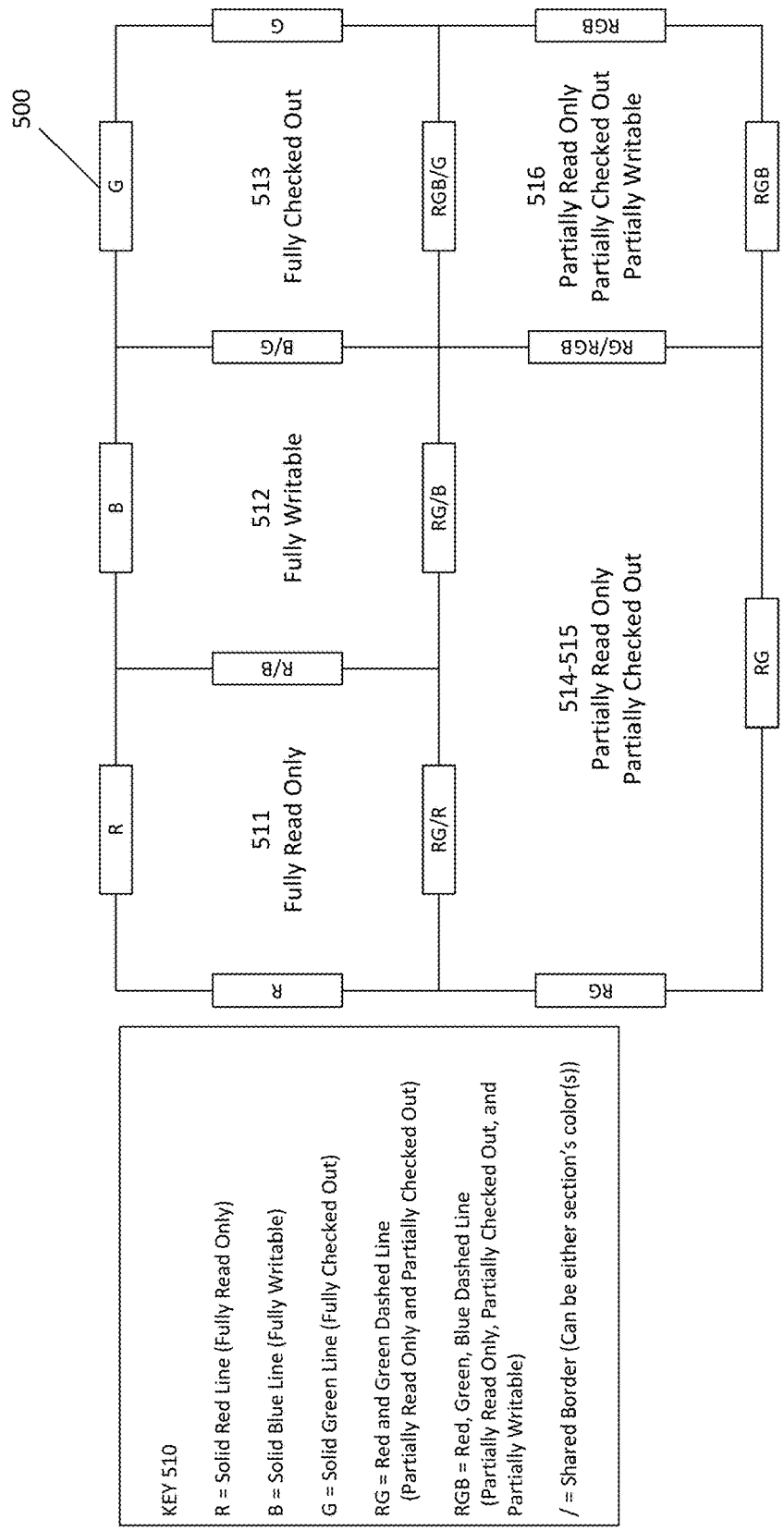
FIGS. 5A-5B are diagrams illustrating example indications of terrain section access levels that may be used in accordance with the present disclosure.

Thus, as described above, terrain editing interface 111 may allow check out and performance of various other operations on selected sections and selected terrain data types. In some examples, it may be advantageous for terrain editing interface 111 to provide status information for various terrain sections, for example to allow users to quickly and easily determine their access level (e.g., checked out, locally writable, read only, etc.) associated with the terrain sections. In some cases, terrain editing interface 111 may provide this status information using one or more visual indications, such as color-coded section boundaries. Referring now to FIG. 5A some example visual indications of terrain section access levels will now be described in detail. In particular, FIG. 5A depicts an example representation of six terrain sections 511-516, such as may be displayed within a section editing area of a terrain editing interface. As shown in FIG. 5A, the terrain sections 511-516 each have at least a partially different access level status in relation to a user of the terrain editing interface. In particular, terrain section 511 has a status of Fully Read Only, meaning that the user has read only access to all data types (e.g., height, vegetation, textures, layers) for section 511. Data types having read only access in a particular terrain section cannot be edited in that terrain section. Terrain section 512 has a status of Fully Writable, meaning that the user has writable access to all data types for section 512. Data types having writable access in a particular terrain section are editable in that terrain section but may be checked out by another user. Terrain section 513 has a status of Fully Checked Out, meaning that the user has checked out all data types for section 513. Terrain sections 514 and 515 have a status of Partially Read Only and Partially Checked Out, meaning that the user has read only access to one or more data types for each of sections 514 and 515 and has checked out one or more data types for each of sections 514 and 515. Terrain section 516 has a status of Partially Read Only, Partially Checked Out, and Partially Writable, meaning that the user has read only access to one or more data types for section 516, has checked out one or more data types for section 516, and has writable access to one or more data types for section 516.

As also shown in FIG. 5A, the borders of sections 511-516 are each depicted with the exception of the border between sections 514 and 515. In the example of FIG. 5A the border between sections 514 and 515 is not shown because, as described above, sections 514 and 515 share an identical status (i.e., Partially Checked Out and Partially Read Only). Thus, removing the border between these sections allows a user to quickly and easily identify that they share an identical status. Additionally, in the example of FIG. 5A, the displayed borders may be color coded to assist the user to quickly and easily identify a status of particular terrain sections surrounded by those borders. For example, each displayed terrain section border in FIG. 5A has a color indication tab 500 that includes an abbreviation indicating the color of the corresponding border. Specifically, as shown in key 510, the abbreviation R indicates a solid red line border, which indicates a status of Fully Read Only. The abbreviation B indicates a solid blue line border, which indicates a status of Fully Writable. The abbreviation G indicates a solid green line border, which indicates a status of Fully Checked Out. The abbreviation RG indicates a red and green dashed line border, which indicates a status of Partially Read Only and Partially Checked Out. The abbreviation RGB indicates a red, green, and blue dashed line border, which indicates a status of Partially Partially Read Only, Partially Checked Out, and Partially Writable.

In the example of FIG. 5A, terrain section 511 is surrounded (or partially surrounded) by solid red borders in order to indicate that terrain section 511 is Fully Read Only. It is noted that the top and left side borders of terrain section 511 are unshared borders that are not shared with any of the other displayed terrain sections. Thus, in this example, the color indication tab 500 for the top and left side borders of terrain section 511 includes the abbreviation R to indicate that they will be shown using a solid red line. By contrast, the bottom and right side borders of terrain section 511 are shared borders that are shared with other terrain sections. For example, the right side border of terrain section 511 is shared with terrain section 512. Thus, in this example, the color indication tab 500 for the right side border of terrain section 511 includes the abbreviation R/B to indicate that this border may either be shown using a solid red line (corresponding to terrain section 511) or a solid blue line (corresponding to terrain section 512). As indicated by key 510, a forward slash (/) symbol in a color indication tab 500 indicates a shared border that may include the color(s) of either terrain section that it borders.

In addition to terrain section 511, FIG. 5A also shows that terrain section 512 is surrounded (or partially surrounded) by solid blue borders in order to indicate that terrain section 511 is Fully Writable. Terrain section 513 is surrounded (or partially surrounded) by solid green borders in order to indicate that terrain section 513 is Fully Checked Out. Terrain sections 514 and 515 are surrounded (or partially surrounded) by red and green dashed line borders in order to indicate that terrain sections 514 and 515 are Partially Read Only and Partially Checked Out. Terrain section 516 is surrounded (or partially surrounded) by red, green, and blue dashed line borders in order to indicate that terrain section 516 is Partially Read Only, Partially Checked Out, and Partially Writable. In some examples, the color coded border indications of FIG. 5A may be advantageous for a number of reasons, for example because they may, in some cases, be easily recognizable and distinguishable by a user while providing minimal (if any) interference or blocking of underlying graphical or other data. It is noted, however, that the color coded border indications of FIG. 5A are merely some example indications of terrain section status and that many other additional or alternative indications may be employed in accordance with the disclosed techniques, including other visual, audio, tactile, and more types of indications.

Figure 5B:
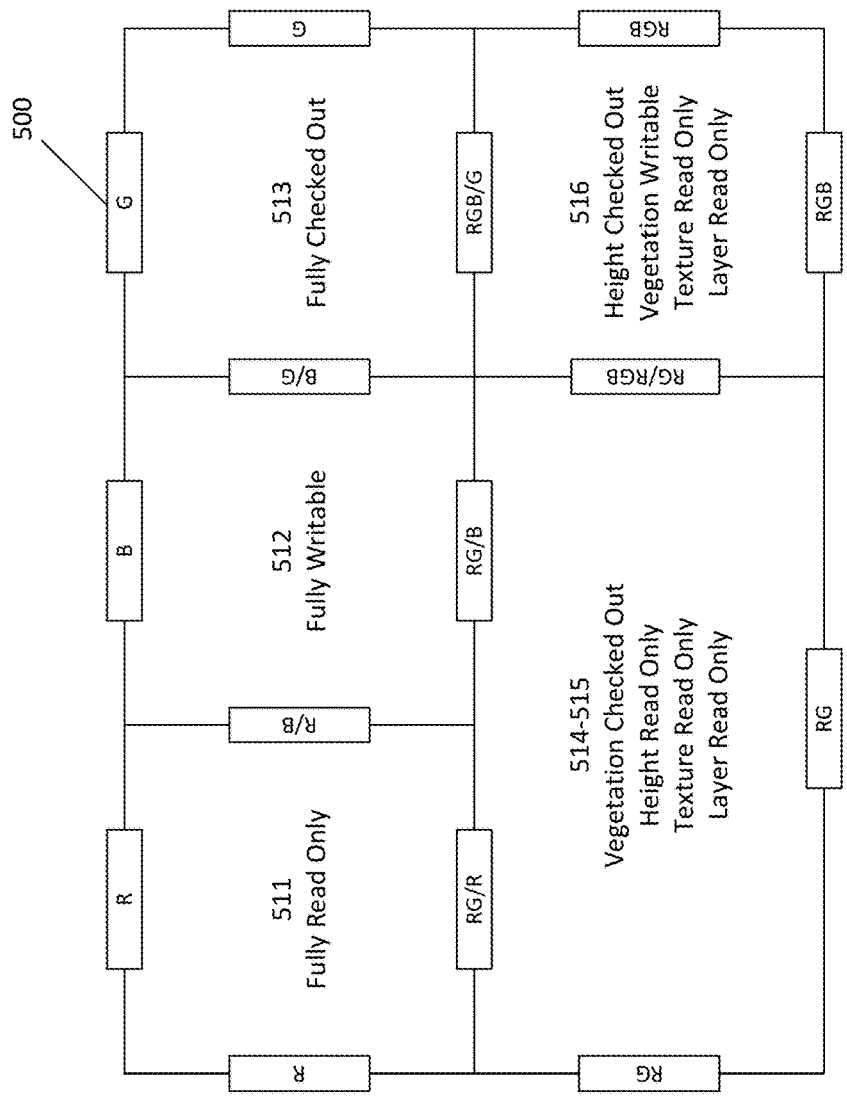

In some examples, the terrain editing interface may provide more detailed descriptions of the status of various terrain sections. Referring now to FIG. 5B, it is seen that the terrain editing interface may sometimes provide visual indications of the status of each individual data type for each terrain section 511-516. For example, for terrain section 516, the red, green and blue border surrounding (or partially surrounding) the terrain section 516 may indicate that the status of Partially Read Only, Partially Checked Out, and Partially Writable. However, even with this color coded border, a user may still be unaware of which individual data types (e.g., height, vegetation, textures, layers) are read only, writable, or checked out. However, the example of FIG. 5B, additional textual information is displayed in terrain section 516 indicating that, for terrain section 516, the user has checked out height data, has writable access to vegetation data, and has read only access to texture and layer data. Additionally, additional textual information is displayed in terrain sections 514 and 515 indicating that, for terrain sections 514 and 515, the user has checked out vegetation data and has read only access to height, texture, and layer data. In some examples, a user may request terrain section status information, such as shown in FIG. 5A and/or FIG. 5B, to be displayed using the check out sections tool 410 of FIG. 4, for example by selecting Show Section Info button 442.

As set forth above, terrain editing interface 111 may, in some cases, display graphical representations of the terrain of various terrain sections. As should be appreciated, the graphical display of terrain features may assist terrain designers in the process of designing and editing terrain. However, one disadvantage related to the graphical display of terrain features is that it may, in some cases, require large amounts of data to be loaded in memory, particularly for displays of larger virtual areas including large amounts of terrain. In some cases, this may potentially reduce the responsiveness and otherwise impede the performance of the terrain editing interface 111. In some examples, in order to help reduce the amount of data stored in memory, terrain editing interface may allow terrain data for fully read only terrain sections to be unloaded, which may help to manage complexity of the displayed terrain and improve responsiveness and performance of the terrain editing interface 111. Additionally, in some examples, if this data is subsequently desired by a user, the user may also request that the data be reloaded by the terrain editing interface 111, for example so that the terrain features may again be displayed to the user.

Figure 6A:
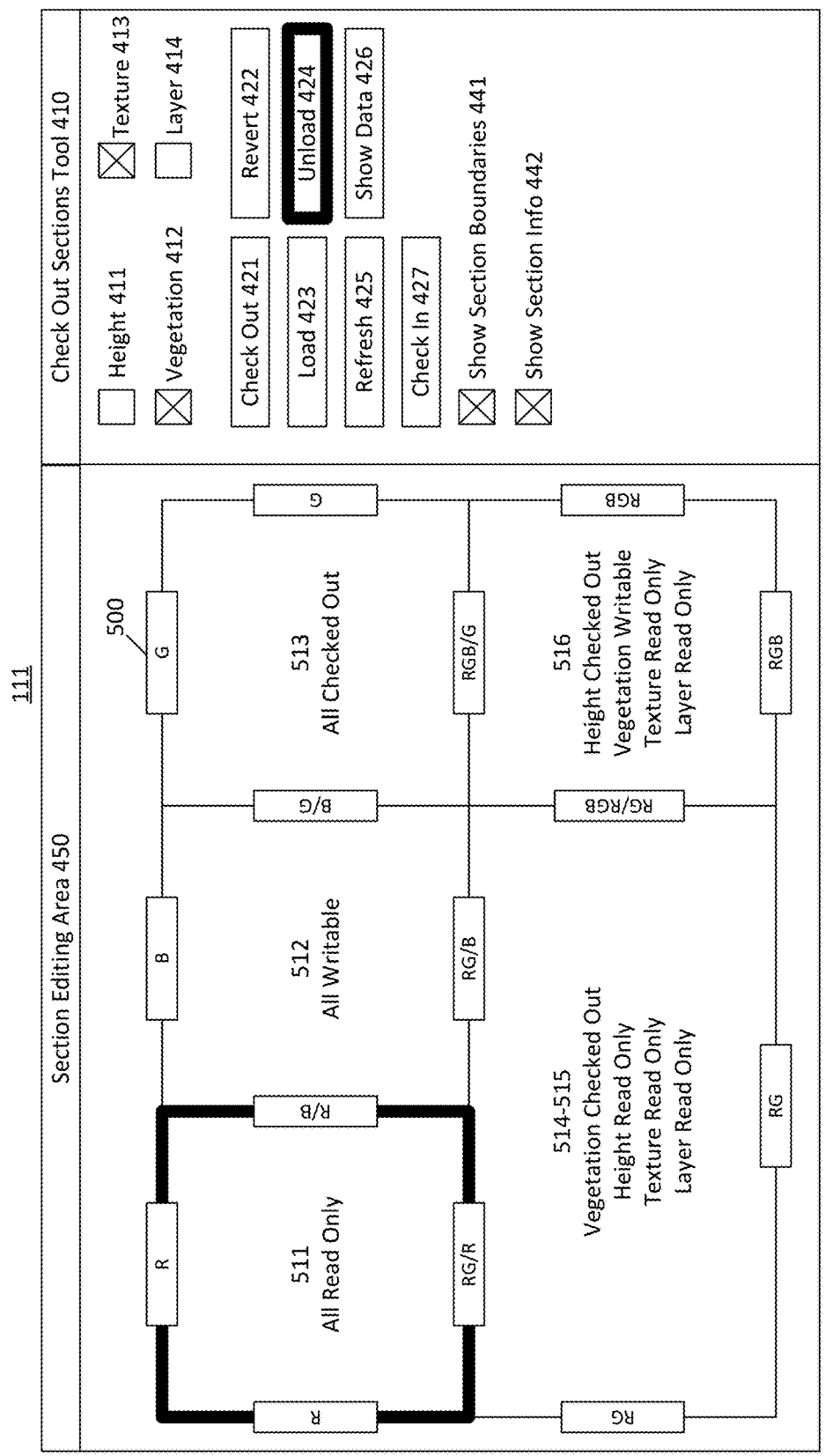
FIGS. 6A-6D are diagram illustrating example loading and unloading of a terrain section that may be used in accordance with the present disclosure.
Figure 6B:
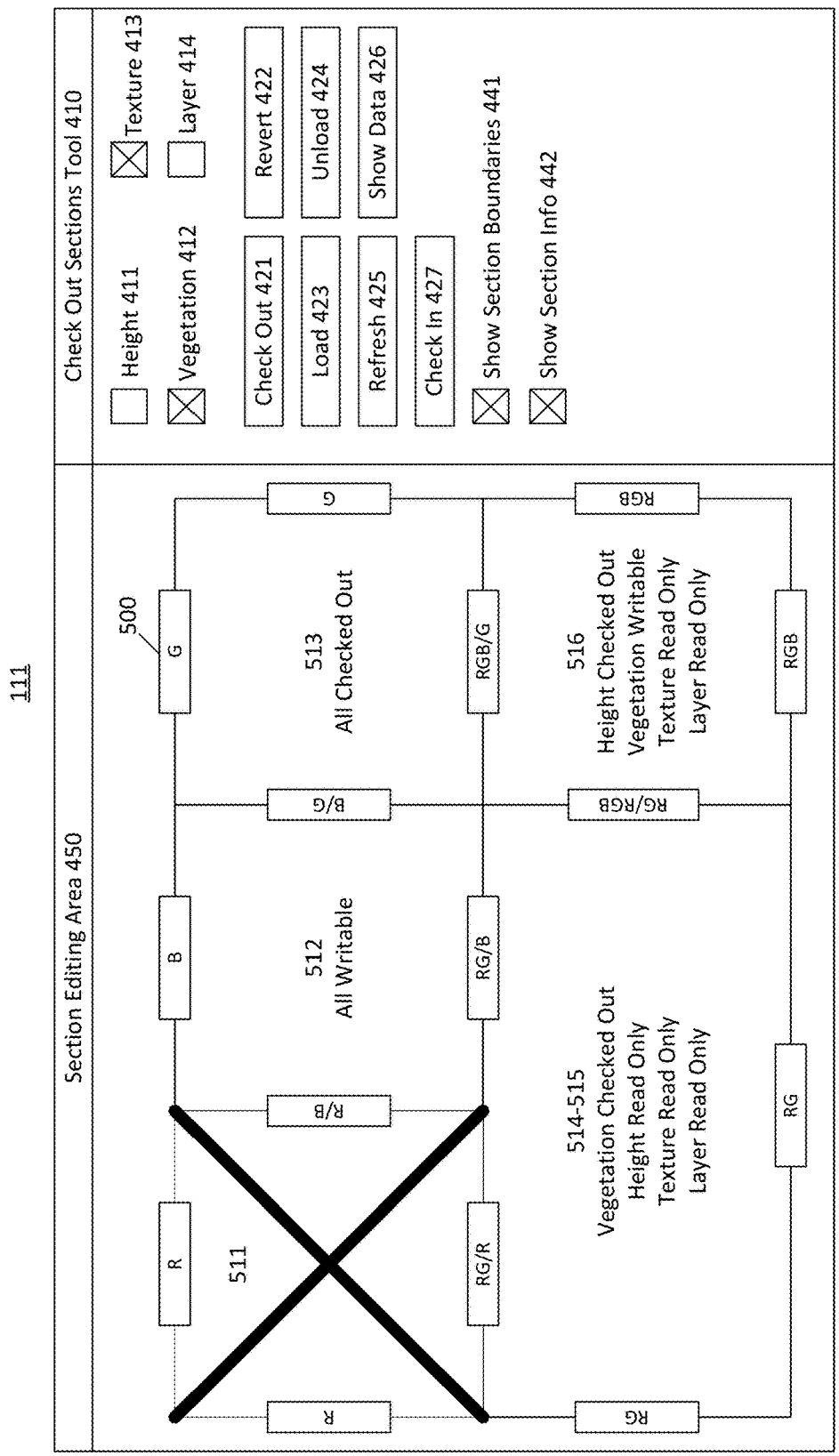

Some examples of loading and unloading of a terrain section will now be described with respect to FIGS. 6A-6D. In particular, referring to FIG. 6A, it is seen that a user has selected fully read only terrain section 511, as indicated by the thick and bold border surrounding terrain section 511. In the example of FIG. 6A, the terrain data for terrain section 511 is currently loaded. However, it is also seen in FIG. 6A that the user is in the process of selecting Unload button 424, as indicated by the thick and bold border surrounding Unload button 424. After being selected, Unload button 424 will cause the terrain data associated with terrain section 511 to be unloaded from memory by the terrain editing interface 111. FIG. 6B represents terrain section 511 after the selection of Unload button 424. As shown in FIG. 6B, the terrain data associated with terrain section 511 has been unloaded from memory, as indicated by the thick and bold X displayed over terrain section 511 in FIG. 6B. The unloading of the terrain data for terrain section 511 may cause graphical representations of the terrain features of terrain section 511 to cease to be displayed in the section editing area 450. Accordingly, in some examples, as opposed to being covered by an X as shown in FIG. 6B, the area of terrain section 511 may instead be covered by a black box or other indication that the graphical display of terrain for that area has been removed.

Figure 6C:
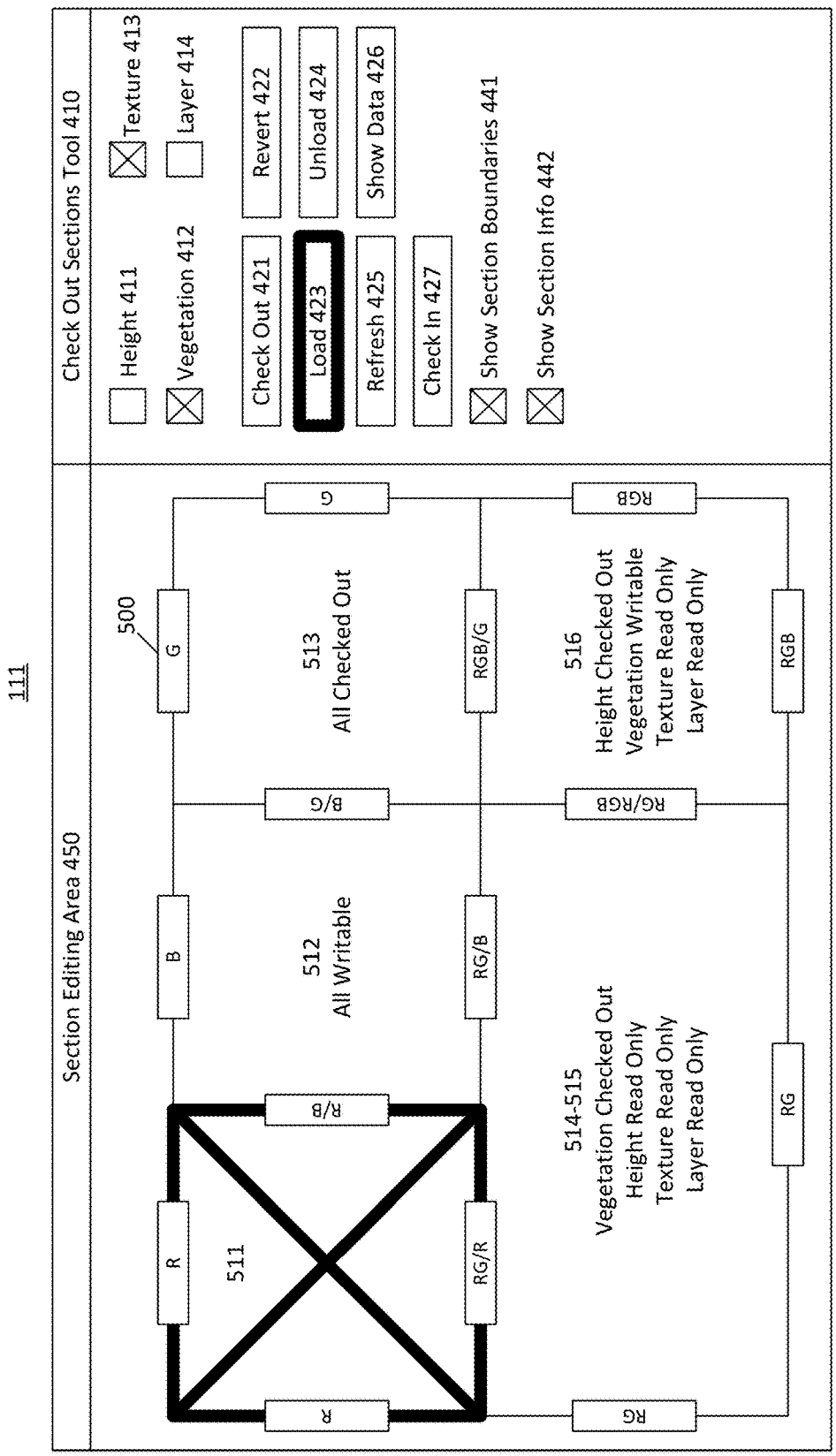
Figure 6D:
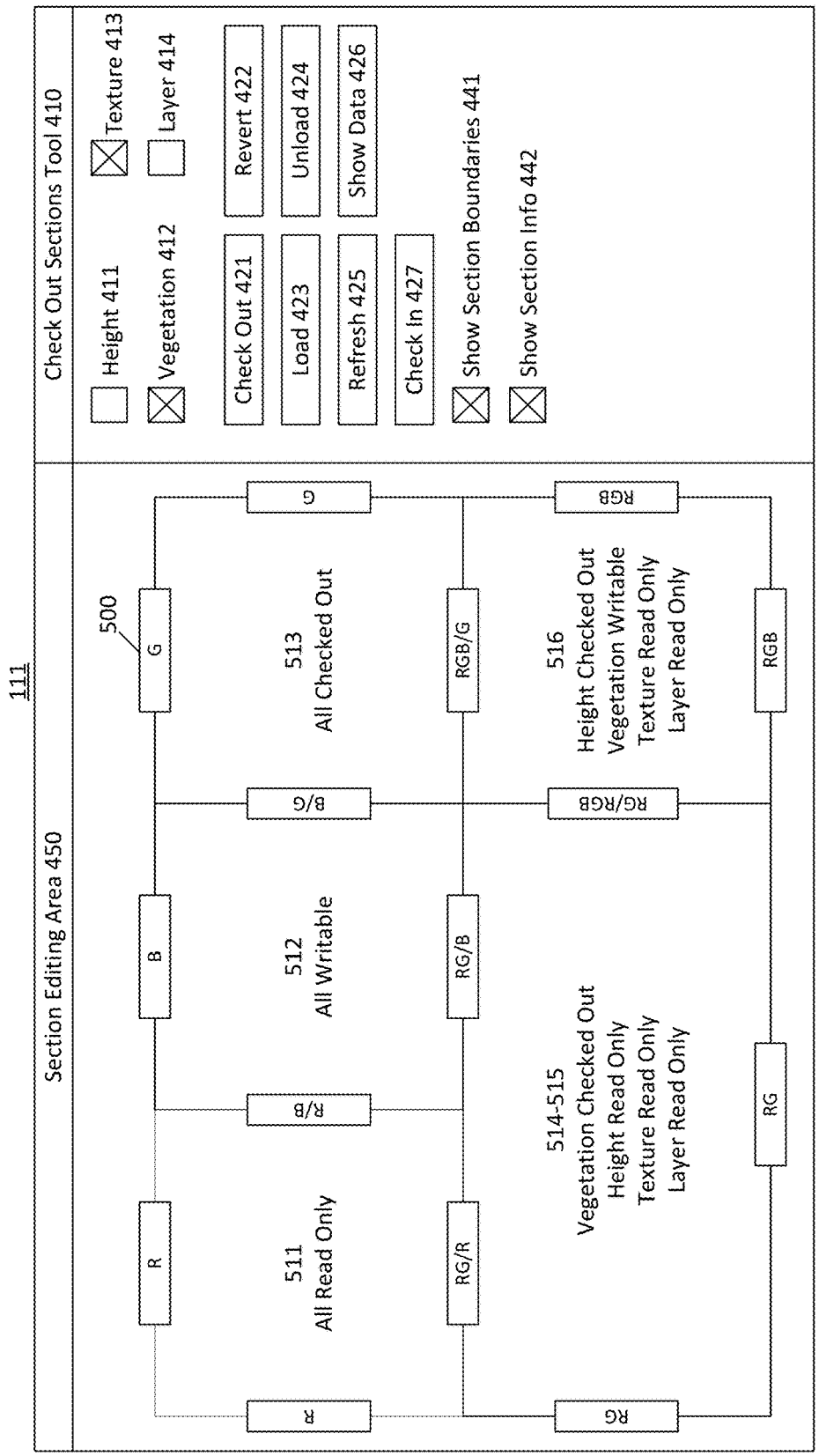

As set forth above, in some examples, a user may also load or reload terrain data for a terrain section for which terrain data has been unloaded. Referring now to FIG. 6C, it is seen that a user has again selected read only terrain section 511, as indicated by the thick and bold border surrounding terrain section 511 in FIG. 6C. In the example of FIG. 6C, the terrain data for terrain section 511 is currently unloaded, as indicated by the X covering terrain section 511. However, it is also seen in FIG. 6C that the user is in the process of selecting Load button 423, as indicated by the thick and bold border surrounding Load button 423. After being selected, Load button 423 will cause the terrain data associated with terrain section 511 to be loaded into memory by the terrain editing interface 111. FIG. 6D represents terrain section 511 after the selection of Load button 423. As shown in FIG. 6D, the terrain data associated with terrain section 511 has been loaded into memory, as indicated by the removal of the thick and bold X formerly displayed over terrain section 511 in FIGS. 6B and 6C. The loading of the terrain data for terrain section 511 may allow graphical representations of the terrain features of terrain section 511 to again be displayed in the section editing area 450.

Figure 7A:
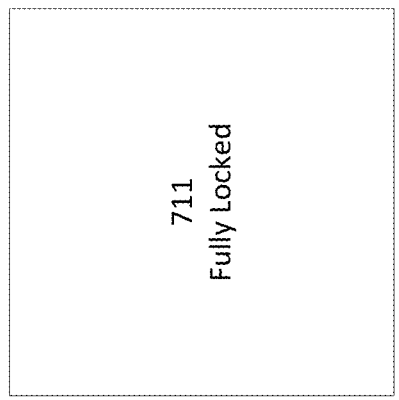
FIGS. 7A-7C are diagrams illustrating example indications of terrain section locking status that may be used in accordance with the present disclosure.
Figure 7B:
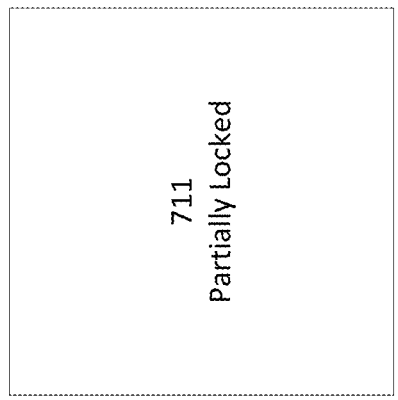
Figure 7C:
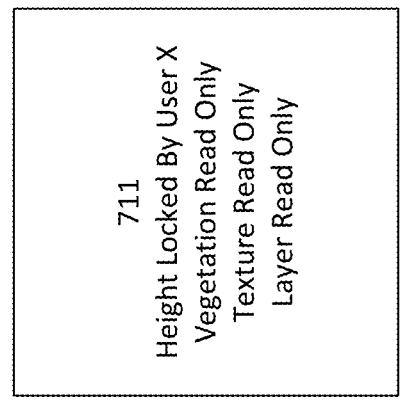

As set forth above with respect to FIGS. 5A and 5B, terrain editing interface 111 may provide indications regarding a user's access level (e.g., checked out, writable, read only, etc.) of various terrain sections. Additionally, in some examples, terrain editing interface 111 may also provide indications regarding a locking status (e.g., fully locked, partially locked, not locked, etc.) of one or more terrain sections. Referring now to FIGS. 7A-7C, some example visual indications of terrain section locking status will now be described in detail. In particular, FIG. 7A depicts an example representation of a terrain section 711, such as may be displayed within a section editing area of a terrain editing interface. As shown in FIG. 7A, terrain section 711 includes a textual indication that it is Fully Locked, meaning that all data types (e.g., height, vegetation, textures, layers) are checked out by one or more other users of the terrain editing interface 111. Referring now to FIG. 7B, a second example is shown in which terrain section 711 includes a textual indication that it is Partially Locked, meaning that at least one data type is checked out by at least one other user of the terrain editing interface 111. It is noted, however, that the indications of FIG. 7B do not specify which individual data types are checked and by which particular other users. Finally, referring to FIG. 7C, a third example is shown in which terrain section 711 includes textual indications of which individual data types are checked out and by which particular other users. In particular, FIG. 7C indicates that, in this example, height data is checked out by User X, while vegetation, texture, and layer data are read only and, therefore, are not checked out to other users. As set forth above, in some examples, contact information and/or communication interfaces may also be provided for User X in order to allow the user viewing the indication in FIG. 7C to contact User X and request check out and/or further collaboration for terrain section 711.

Figure 8:
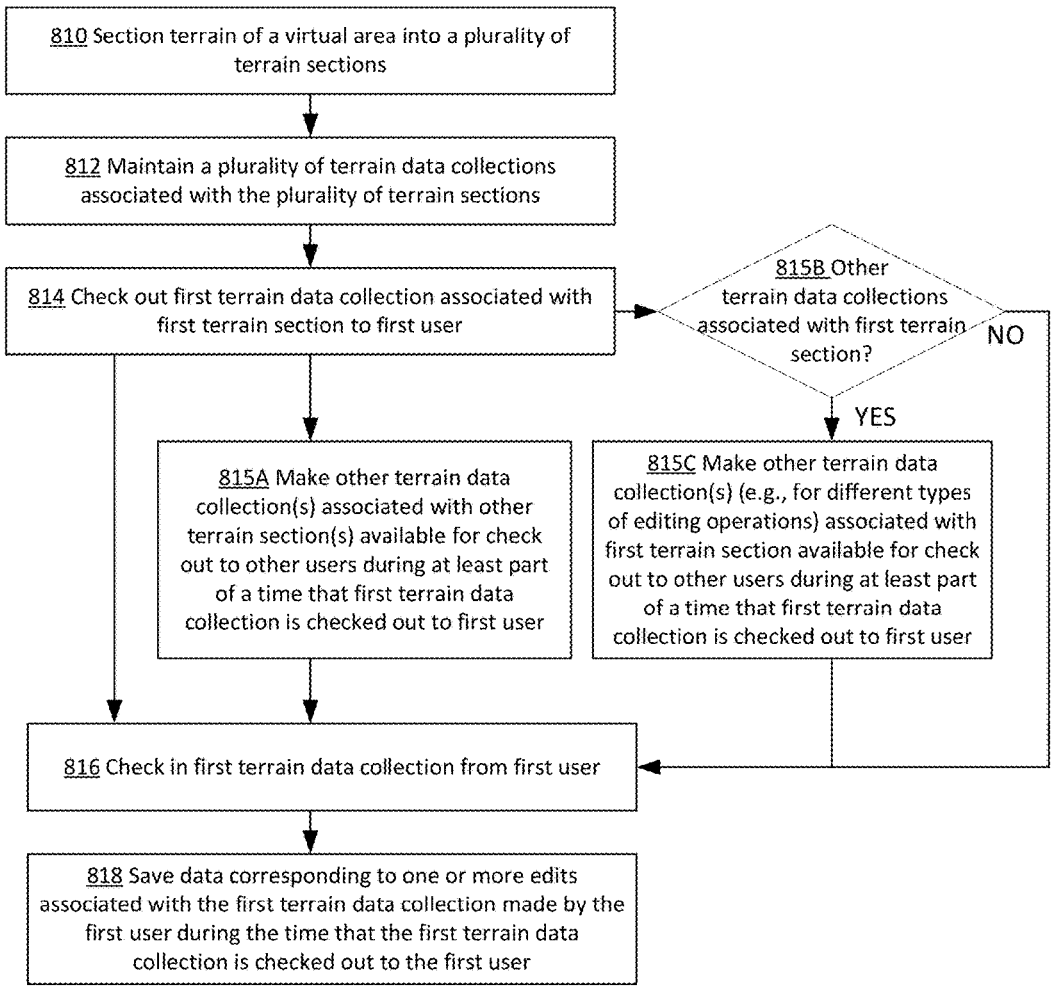
FIG. 8 is a flowchart illustrating an example an example sectional terrain editing process that may be used in accordance with the present disclosure.

FIG. 8 is a flowchart illustrating an example an example sectional terrain editing process that may be used in accordance with the present disclosure. As shown, the process of FIG. 8 is initiated at operation 810, at which terrain of at least part of a virtual area associated with an electronically presented content item, such as a video game, is sectioned into a plurality of terrain sections. Operation 810 may be performed for example, by associating or assigning different coordinate (e.g., X, Y coordinates) ranges or values or other location identifiers to different terrain sections. In the particular example, of FIG. 1, a virtual area 210 is sectioned into sixteen equal-sized square-shaped terrain sections 211-226. As set forth above, other quantities, shapes, sizes, etc. of terrain sections may also be employed in accordance with the disclosed techniques.

At operation 812, a plurality of terrain data collections associated with the plurality of terrain sections are maintained, for example by section terrain data manager 120 of FIG. 1. As set forth above, in some examples, each of the plurality of terrain sections may have at least one associated terrain data collection of the plurality of terrain data collections. For example, in some cases, all terrain data for each terrain section may be maintained in a single terrain data collection associated with the terrain section, for example as shown in FIG. 2A. In other examples, one or more terrain sections may each have an associated group of a plurality of associated terrain data collections, for example associated with a plurality of different types of terrain editing operations. For example, in some cases, such as shown in FIG. 2B, each terrain section may have an associated group of terrain data collections including a data collection associated with terrain height data, a data collection associated with terrain vegetation data, a data collection associated with terrain texture data, and a data collection associated with terrain layer data. As also set forth above, in some examples, terrain data collections in the same group of data collections may be made available to be concurrently checked out by the same or different users.

At operation 814, a first terrain data collection associated with a first terrain section is checked out to a first user, for example by terrain editing interface 111 and/or sectional terrain data manager 120. The first terrain data collection may be checked out for editing of terrain of the first terrain section in the terrain editing interface 111. As set forth above, in some examples, the first user may request check out of the first terrain data collection by selecting the first terrain section in section editing area 450 of FIG. 4, selecting a terrain data type (e.g., via check boxes 411-414 or other controls) in the check out sections tool 410 of FIG. 4, and selecting a check out control (e.g., Check out button 421). In other examples, the first user may be prompted to check out the first data collection, for example when the first user makes edits to associated terrain data in the terrain editing interface and it is determined that the first terrain data collection is not yet checked out to the first user. As set forth above, checking out of the first terrain data collection to the first user may include and/or trigger locking of the first terrain data collection such that users other than the first user cannot save changes to the first terrain data collection during a time that the first data collections is checked out/locked by the first user.

At operation 815A, during at least part of the time that the first terrain data collection is checked out to the first user, one or more other terrain data collections associated with one or more other terrain sections are made available for check out to one or more users other than the first user. For example, as shown in FIG. 1, a first user (e.g., a user of client 110A) may have checked out a terrain data collection associated with terrain section 211, while a second user (e.g., a user of client 110B) may concurrently have checked out a terrain data collection associated with terrain section 215, and a third user (e.g., a user of client 110N) may concurrently have checked out terrain data collections associated with terrain sections 220 and 221. As set forth above, this enables multiple different users to simultaneously edit different portions of terrain with the expectation and confidence that their edits will be successfully saved and will not conflict with edits made by other users.

At 815B, if there are no other terrain data collections associated with the first terrain section, then the process proceeds to operation 816. By contrast, if, at 815B, there are other terrain data collections associated with the first terrain section, then the process proceeds to operation 815C, at which one or more other terrain data collections associated with the first terrain section are made available to one or more users other than the first user. For example, as shown in FIG. 1, a first user (e.g., a user of client 110A) may have checked out a terrain data collection associated with terrain vegetation data for terrain section 211, while a second user (e.g., a user of client 110B) may concurrently have checked out a terrain data collection associated with terrain height data for terrain section 211, and a third user (e.g., a user of client 110N) may concurrently have checked out terrain data collections associated with terrain texture data and terrain layer data for terrain section 211. As set forth above, this enables multiple different users to simultaneously perform different types of editing operations on the same portions of terrain with the expectation and confidence that their edits will be successfully saved and will not conflict with edits made by other users.

At operation 816, after some period of time, the first terrain data collection is checked in from the first user, for example by terrain editing interface 111 and/or sectional terrain data manager 120. As set forth above, in some examples, the first user may request check in of the first terrain data collection using Check In button 427 and/or other controls. As also set forth above, checking in of the first terrain data collection from the first user may include and/or trigger unlocking of the first terrain data collection such that users other than the first user may check out the first terrain data collection. At operation 818, data corresponding to one or more edits associated with the first terrain data collection made by the first user during the time that the first data collection is checked out to the first user is saved to the first data collection. It is noted that, to ensure that the first user's edits to the first terrain data collection are properly saved, the saving of data performed at operation 818 may be performed prior to allowing check out of the first terrain data collection to any other users.

As also set forth above, in combination with the editing process of FIG. 8, a terrain editing interface in accordance with the disclosed techniques may provide a number of additional features to assist in efficiently collaborating on terrain editing operations. For example, as set forth above, the terrain editing interface may provide one or more indications of whether a terrain section has at least one associated terrain data collection that is at least one of checked out by the first user, writable by the first user, or read only accessible by the first user. These indications may include, for example, one or more color coded terrain section borders, such as shown in the examples of FIGS. 5A-5B. Additionally, in some examples, the terrain editing interface may allow unloading, from memory, of terrain data associated with a terrain section to which a user has read only access, such as shown in the examples of FIGS. 6A-6D. Furthermore, in some examples, the terrain editing interface provide one or more indications that a terrain section is locked or partially locked, along with indications of other users to which the terrain sections are locked, such as shown in the examples of FIGS. 7A-7C. Many other additional features of the terrain editing interface are also described in detail above and are not repeated here.

Figure 9:
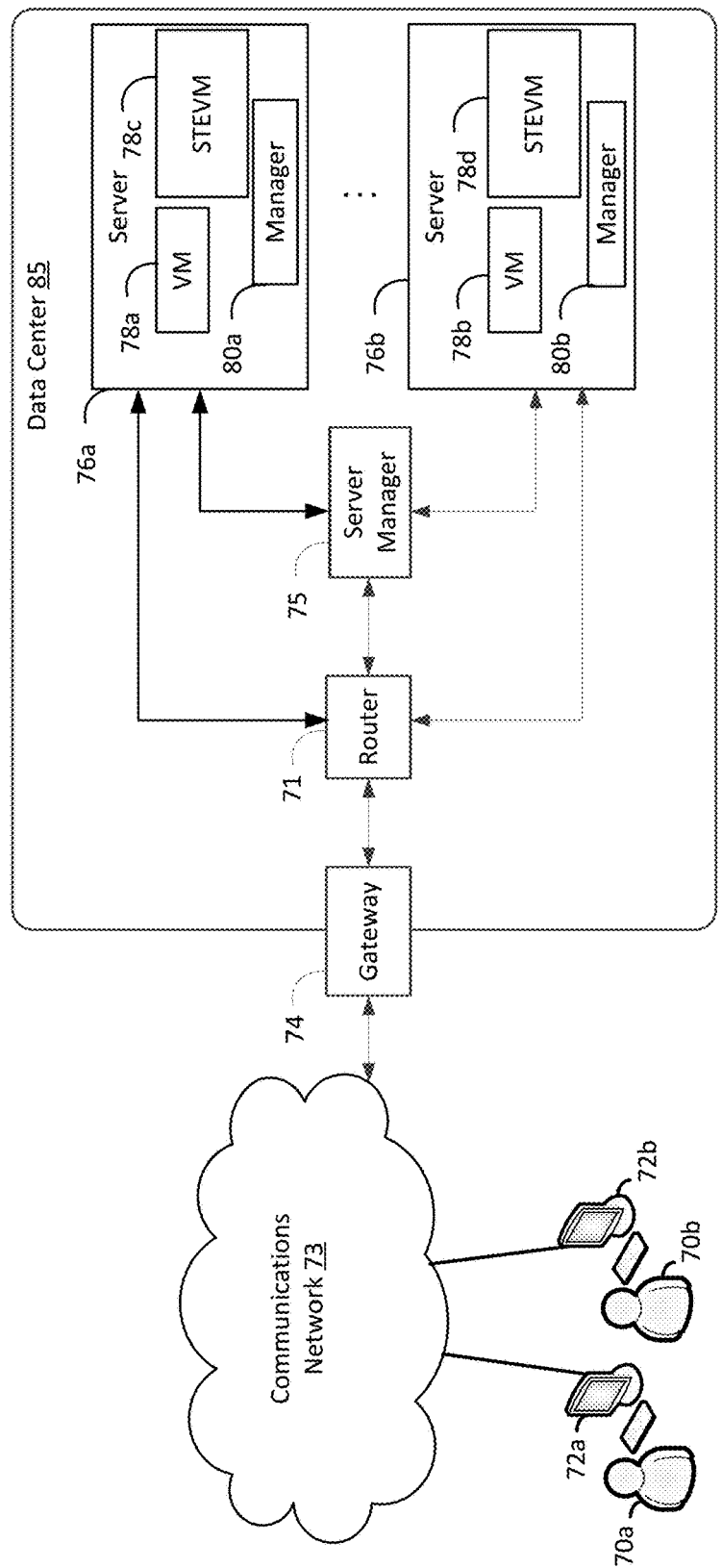
FIG. 9 is a diagram illustrating an example system for transmitting and providing data that may be used in accordance with the present disclosure.

An example system for transmitting and providing data will now be described in detail. In particular, FIG. 9 illustrates an example computing environment in which the embodiments described herein may be implemented. FIG. 9 is a diagram schematically illustrating an example of a data center 85 that can provide computing resources to users 70a and 70b (which may be referred herein singularly as user 70 or in the plural as users 70) via user computers 72a and 72b (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-d (which may be referred herein singularly as virtual machine instance 78 or in the plural as virtual machine instances 78). Virtual machine instances 78c and 78d are sectional terrain editing virtual machine ("STEVM") instances. The STEVM virtual machine instances 78c and 78d may be configured to perform all, or any portion, of the singleton coordination techniques and/or any other of the disclosed techniques in accordance with the present disclosure and described in detail above. As should be appreciated, while the particular example illustrated in FIG. 9 includes one STEVM virtual machine in each server, this is merely an example. A server may include more than one STEVM virtual machine or may not include any STEVM virtual machines.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 9, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 9 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 9, a router 71 may be utilized to interconnect the servers 76*a* and 76*b*. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 9, a server manager 75 is also employed to at least in part direct various communications to, from and/or between servers 76*a* and 76*b*. While FIG. 9 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 9 has been greatly simplified and that many more networks and networking devices may be utilized to interconnect the various computing systems disclosed herein. These network topologies and devices should be apparent to those skilled in the art.

It should also be appreciated that data center 85 described in FIG. 9 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 10:
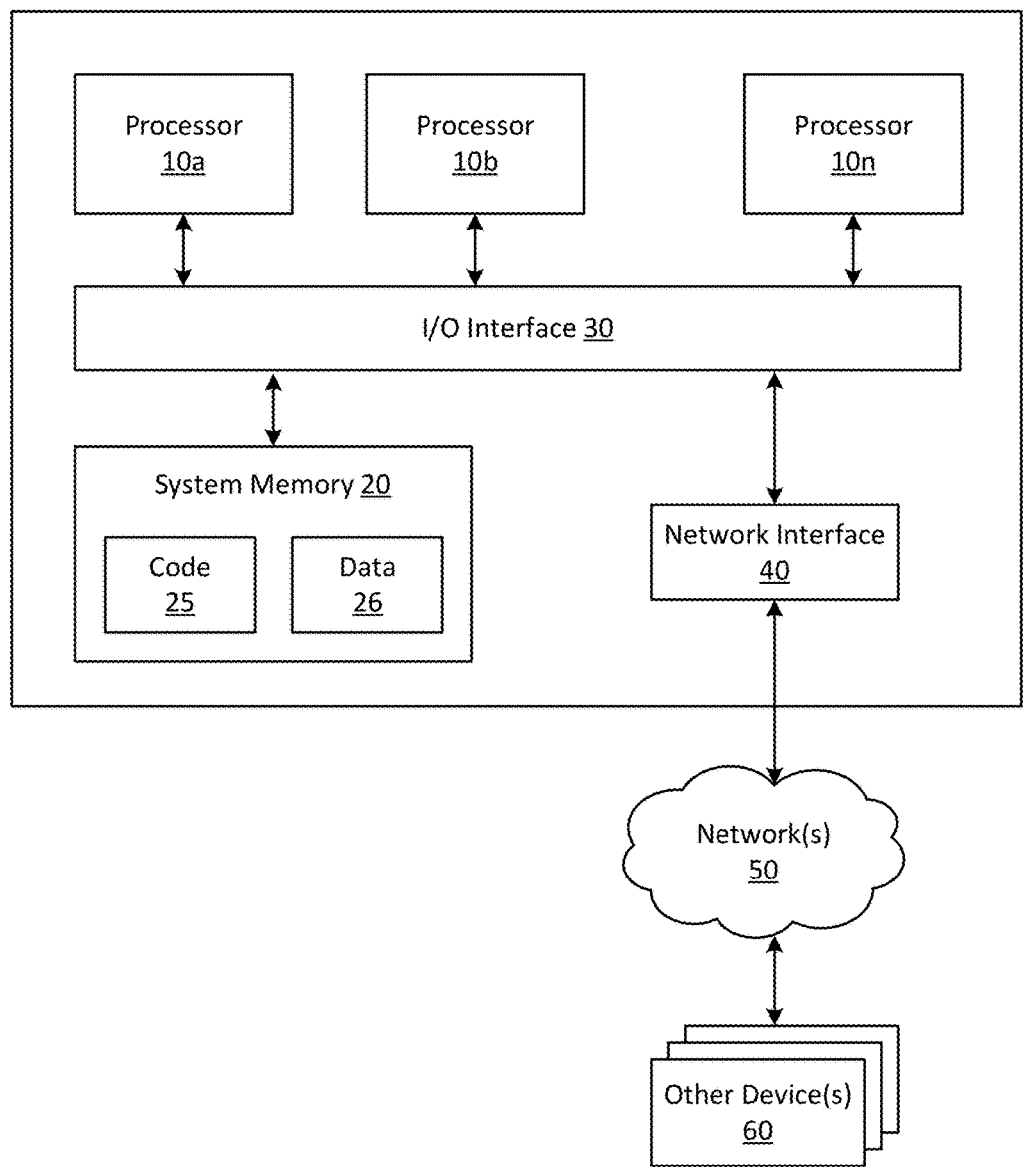
FIG. 10 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 10 depicts a computer system that includes or is configured to access one or more computer-accessible media. In the illustrated embodiment, computing device 15 includes one or more processors 10*a*, 10*b* and/or 10*n* (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system for sectional terrain editing comprising:
   one or more processors; and
   one or more memories having stored therein instructions that, upon execution by the one or more processors, cause the computing system perform operations comprising:
      sectioning terrain of at least part of a virtual area associated with a video game into a plurality of terrain sections;
      maintaining a plurality of terrain data collections associated with the plurality of terrain sections, each of the plurality of terrain sections having at least one associated terrain data collection of the plurality of terrain data collections;
      checking out, to a first user, a first terrain data collection of the plurality of terrain data collections associated with a first terrain section of the plurality of terrain sections for editing terrain of the first terrain section in a terrain editing interface;
      checking in, from the first user, the first terrain data collection; and
      saving, to the first data collection, data associated with one or more edits to the first data collection made by the first user during a time that the first data collection is checked out to the first user,
      wherein, during at least part of the time that the first terrain data collection is checked out to the first user, a second terrain data collection of the plurality of terrain data collections associated with a second terrain section of the plurality of terrain sections is made available to be checked out to a second user.

2. The computing system of claim 1, wherein a first group of terrain data collections of the plurality of terrain data collections are associated with the first terrain section, the first group of terrain data collections associated with a plurality of types of terrain editing operations.

3. The computing system of claim 2, wherein the first group of terrain data collections are made available to be concurrently checked out to different users.

4. The computing system of claim 2, wherein the first group of terrain data collections comprises a terrain data collection associated with terrain height data, a terrain data collection associated with terrain vegetation data, a terrain data collection associated with terrain texture data, and a terrain data collection associated with terrain layer data.

5. A method for sectional terrain editing comprising:
maintaining a plurality of terrain data collections associated with a plurality of terrain sections for terrain of at least part of a virtual area associated with a content item, each of the plurality of terrain sections having at least one associated terrain data collection of the plurality of terrain data collections;
checking out, to a first user, a first terrain data collection of the plurality of terrain data collections associated with a first terrain section of the plurality of terrain sections for editing terrain of the first terrain section;
checking in, from the first user, the first terrain data collection; and
saving, to the first data collection, data corresponding to one or more edits associated with the first data collection made by the first user during a time that the first data collection is checked out to the first user,
wherein, during at least part of the time that the first terrain data collection is checked out to the first user, a second terrain data collection of the plurality of terrain data collections associated with a second terrain section of the plurality of terrain sections is made available to be checked out to a second user.

6. The method of claim 5, wherein a first group of terrain data collections of the plurality of terrain data collections are associated with the first terrain section, the first group of terrain data collections associated with a plurality of types of terrain editing operations.

7. The method of claim 6, wherein the first group of terrain data collections are made available to be concurrently checked out to different users.

8. The method of claim 6, wherein the first group of terrain data collections comprises a terrain data collection associated with terrain height data, a terrain data collection associated with terrain vegetation data, a terrain data collection associated with terrain texture data, and a terrain data collection associated with terrain layer data.

9. The method of claim 5, further comprising providing, to the first user, one or more indications of whether a terrain section has at least one associated terrain data collection that is at least one of checked out by the first user, writable by the first user, or read only accessible by the first user.

10. The method of claim 9, wherein the one or more indications comprise one or more color coded terrain section borders.

11. The method of claim 5, further comprising providing, to the first user, one or more indications that a terrain section is locked or partially locked.

12. The method of claim 5, further comprising unloading, from memory, terrain data associated with a terrain section to which the first user has read only access.

13. The method of claim 5, further comprising providing displaying a graphical representation of at least part of the terrain of the first terrain section.

14. The method of claim 5, further comprising sectioning the terrain of at least part of the virtual area associated with the content item into the plurality of terrain sections.

15. The method of claim 5, wherein the content item comprises a video game.

16. One or more non-transitory computer-readable storage media having stored thereon instructions that, upon execution by one or more computing devices, cause the one or more compute nodes to perform operations comprising:
maintaining a plurality of terrain data collections associated with a plurality of terrain sections for terrain of at least part of a virtual area associated with a content item, wherein a first terrain section of the plurality of terrain sections has an associated first group of terrain data collections of the plurality of terrain data collections;
checking out, to a first user, a first terrain data collection of the first group of terrain data collections associated with the first terrain section for editing terrain of the first terrain section;
checking in, from the first user, the first terrain data collection; and
saving, to the first data collection, data corresponding to one or more edits associated with the first data collection made by the first user during a time that the first data collection is checked out to the first user,
wherein, during at least part of the time that the first terrain data collection is checked out to the first user, a second terrain data collection of the first group of terrain data collections associated with the first terrain section is made available to be checked out to a second user.

17. The one or more non-transitory computer-readable storage media of claim 16, wherein the first group of terrain data collections is associated with a plurality of types of terrain editing operations.

18. The one or more non-transitory computer-readable storage media of claim 16, wherein during at least part of the time that the first terrain data collection is checked out to the first user, a third terrain data collection of the plurality of terrain data collections associated with a second terrain section of the plurality of terrain sections is made available to be checked out to the second user.

19. The one or more non-transitory computer-readable storage media of claim 16, wherein the first group of terrain data collections comprises a terrain data collection associated with terrain height data, a terrain data collection associated with terrain vegetation data, a terrain data collection associated with terrain texture data, and a terrain data collection associated with terrain layer data.

20. The one or more non-transitory computer-readable storage media of claim 16, wherein the operations further comprise providing, to the first user, one or more indications of whether a terrain section has at least one associated terrain data collection that is at least one of checked out by the first user, writable by the first user, or read only accessible by the first user.

* * * * *